(12) United States Patent
Lebenbom

(10) Patent No.: US 8,723,382 B2
(45) Date of Patent: May 13, 2014

(54) ELECTROMAGNETIC MOTOR-GENERATOR UNIT

(75) Inventor: Matthew A. Lebenbom, West Bloomfield, MI (US)

(73) Assignee: Matthew A. Lebenbom, West Bloomfield, MI (US)

( * ) Notice: Subject to any disclaimer, the term of this patent is extended or adjusted under 35 U.S.C. 154(b) by 370 days.

(21) Appl. No.: 13/089,554

(22) Filed: Apr. 19, 2011

(65) Prior Publication Data

US 2012/0267974 A1    Oct. 25, 2012

(51) Int. Cl.
*H02K 16/00* (2006.01)
(52) U.S. Cl.
USPC ........................................................ 310/113
(58) Field of Classification Search
USPC .................................. 310/112–113
See application file for complete search history.

(56) References Cited

U.S. PATENT DOCUMENTS

| | | | |
|---|---|---|---|
| 2,787,824 A * | 4/1957 | Kaczor | 29/596 |
| 3,577,002 A * | 5/1971 | Hall et al. | 290/46 |
| 3,858,674 A | 1/1975 | Tabor | |
| 4,857,812 A | 8/1989 | Mochizuki et al. | |
| 5,334,897 A | 8/1994 | Ineson et al. | |
| 5,434,454 A * | 7/1995 | Farkas | 290/4 R |
| 5,574,340 A | 11/1996 | Bisel et al. | |
| 5,838,085 A * | 11/1998 | Roesel et al. | 310/113 |
| 7,649,292 B2 * | 1/2010 | Moriya et al. | 310/114 |
| 7,812,500 B1 | 10/2010 | Ham | |

* cited by examiner

*Primary Examiner* — Dang Le
(74) *Attorney, Agent, or Firm* — Brennan Cahill; William Westrich

(57) ABSTRACT

An electromagnetic motor-generator unit (MGU) includes a motor and a generator. The motor includes permanent magnets disposed on a rotor hub, a rotor shaft connected to the hub, and stator brackets arranged in a ring. Each of the brackets forms a generally U-shaped profile. The side walls and base of each bracket includes a post, around which is wound a coil. A first chassis circumscribes the brackets, with the base of each bracket connected to an inner wall of the first chassis. The generator includes insulating rotor plates each having equally spaced teeth. The plates are connected to the shaft. Wedge-shaped permanent magnets are stacked within gaps of the plates. A second chassis circumscribes the plates and the wedge-shaped permanent magnets, and includes coils disposed on an inner face of the second chassis. The coils are connectable to a battery pack to selectively recharge the battery pack.

16 Claims, 6 Drawing Sheets

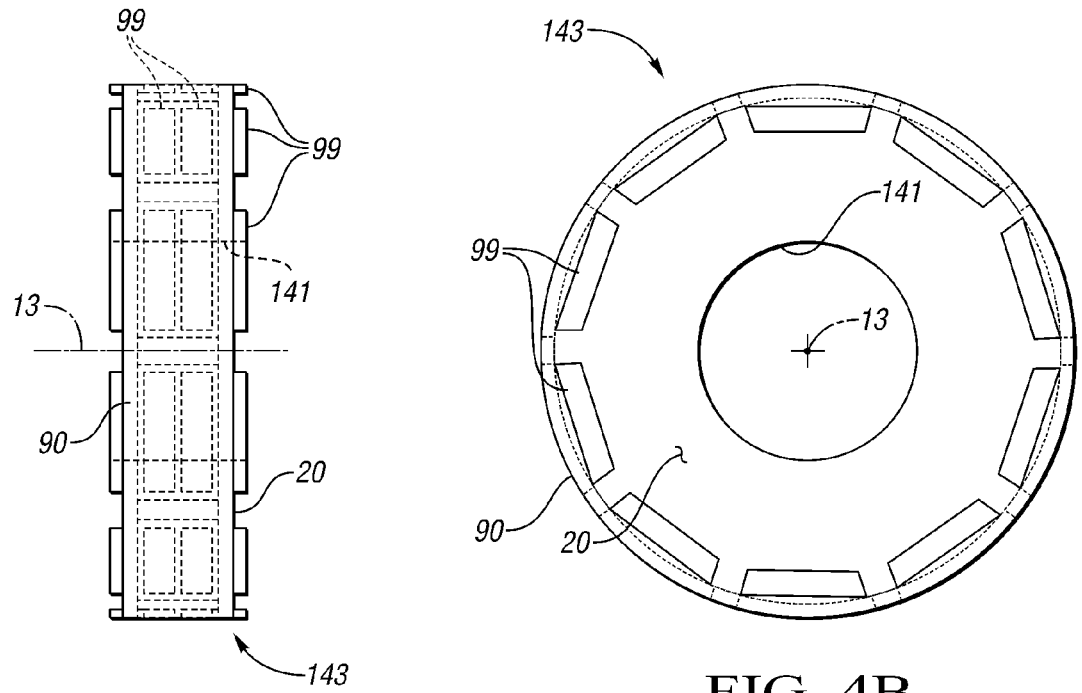
FIG. 4A
FIG. 4B
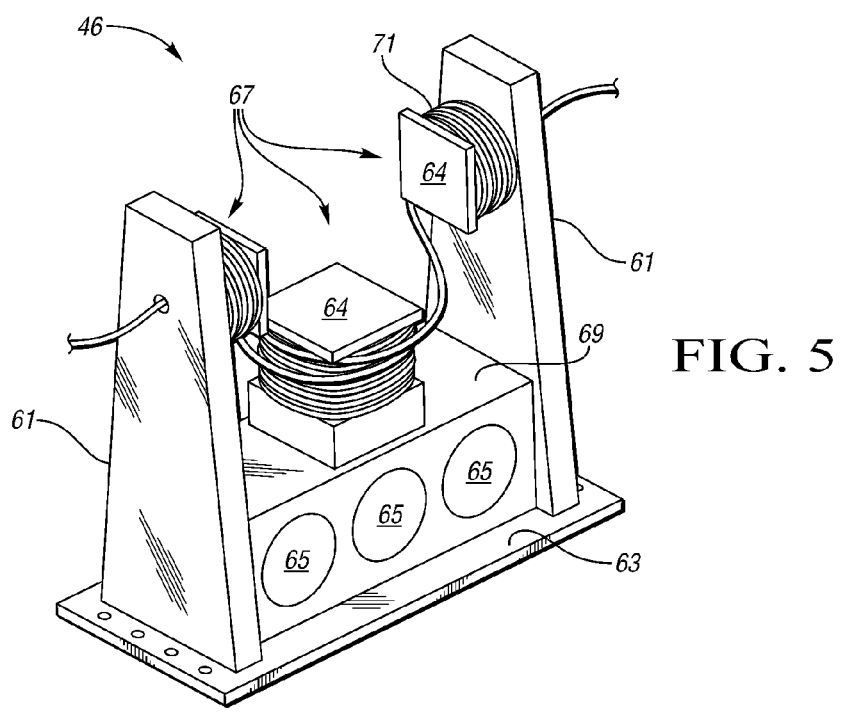
FIG. 5

ELECTROMAGNETIC MOTOR-GENERATOR UNIT

TECHNICAL FIELD

The present disclosure relates to electromagnetic machines or motor-generator units capable of outputting relatively high levels of motor torque.

BACKGROUND

An electric machine converts electrical source energy, e.g., from a battery pack or other direct current (DC) source, into rotational mechanical energy. Electromechanical energy conversion occurs primarily via interaction between the opposing magnetic fields of multiple permanent magnets and electromagnets/coils of the rotor and stator portions of the electric machine. Resultant motor torque may be harnessed as needed in a host of useful applications. Many types of electric motors can also be configured and/or controlled to generate electrical energy for recharging a battery pack and/or for powering one or more electrical systems. Such dual-use electric machines are commonly referred to as motor-generator units (MGUs).

An MGU may be configured as an alternating current (AC) or as a direct current (DC) electric machine. In a brush-type DC motor, the battery pack provides DC electrical energy to multiple rotor coils via a commutator. The commutator causes the electrical current conducted within the rotor coils to switch polarity in conjunction with rotation of the rotor. Brush-type DC motors are useful for many applications. However, because of sustained direct contact with the brushes, such machines tend to experience relatively high friction losses.

In a brushless-type DC (BLDC) electric motor, electronic commutation is used to replace the various mechanical commutators and brushes of the brush-type DC motor. This in turn helps to reduce friction losses, which can make the BLDC motor a potentially attractive option for use in certain applications. However, conventional BLDC motor designs may remain less than optimal when used in certain power- or torque-intensive applications.

SUMMARY

An electromagnetic motor-generator unit (MGU) includes an electric motor and an electric generator. The electric motor includes a rotatable rotor hub, a plurality of permanent magnets disposed on the rotor hub, a rotatable rotor shaft connected to the rotor hub, a first chassis, and a plurality of stator brackets. The stator brackets are equally spaced and arranged in a ring. Each of the stator brackets includes a pair of side walls connected by a transverse member or base to form a generally U-shaped profile. The side walls and base each include a post, around which is wound a respective first, second, and third winding or stator coil. The stator coils are selectively energized via a battery pack. The first chassis is annular, and fully circumscribes the stator brackets, with the base of each stator bracket being connected to an inner wall of the first chassis.

The electric generator is positioned adjacent to and coaxially aligned with the electric motor, and includes a plurality of insulating rotor plates each having equally spaced and outwardly-projecting teeth. A gap is defined between the sides of each of the teeth. The rotor plates are connected to the rotor shaft to rotate in conjunction with the rotor shaft. Wedge-shaped permanent magnets are stacked within the various gaps of the rotor plates to substantially fill the gaps. A second chassis circumscribes the rotor plates and the wedge-shaped permanent magnets, and has a plurality of windings or stator coils disposed on an inner face of the second chassis. The stator coils are connectable to a battery pack to allow electrical current inductively generated within the coils to selectively recharge the battery pack.

A vehicle is also disclosed having a driven wheel, a battery pack, and the MGU noted above.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4A is a schematic side view illustration of an example rotor hub of the motor portion.

FIG. 4B is a plan view of the rotor hub shown in FIG. 4A.

FIG. 5 is a perspective view of an example stator bracket usable within the stator of the motor portion.

DETAILED DESCRIPTION

Figure 1:
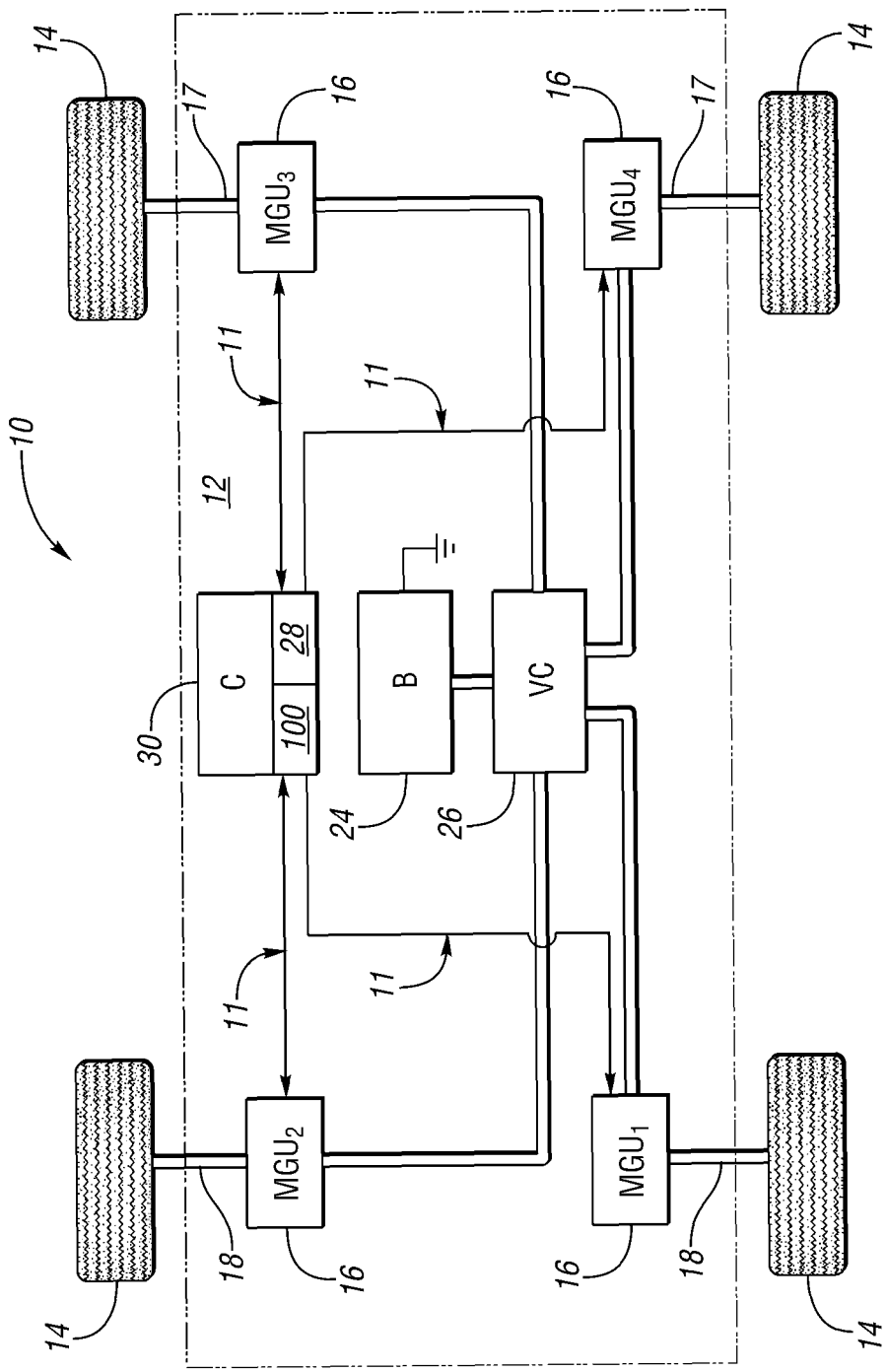
FIG. 1 is a schematic illustration of a vehicle having a plurality of motor-generator units (MGUs) each configured as disclosed herein.

Referring to the various Figures, wherein like numerals indicate like parts throughout the several views, a vehicle 10 is shown schematically in FIG. 1. The vehicle 10 includes at least one motor-generator unit (MGU) 16. Other vehicles such as boats and aircraft may likewise benefit from the use of the presently disclosed MGU 16, and therefore the vehicle 10 of FIG. 1 is provided as an illustrative non-limiting example embodiment.

As will be appreciated by those of ordinary skill in the art, the present MGU 16 may also be used to power any rotatable shaft in any system. The range of possible applications is not limited to vehicular use. The example vehicle 10 is therefore intended to illustrate a fairly typical high-torque application. In other examples, the MGU 16 may be used to start or power a jet engine or an internal combustion engine, pumps, or other electrical and/or mechanical systems.

The vehicle 10 may include a chassis 12 and a plurality of powered or driven wheels 14 generally positioned at the corners of the chassis 12. The vehicle 10 may also include an MGU 16 for each driven wheel 14, such that the motor torque provided to each driven wheel 14 may be independently generated and delivered by a corresponding MGU 16. This dedicated motor torque functionality is indicated for clarity by $MGU_1$, $MGU_2$, $MGU_3$, and $MGU_4$, with the numerals 1-4 referring to the $1^{st}$-$4^{th}$ corners of the vehicle 10 in a conventional 4-wheel vehicle. More or fewer driven wheels 14 could also be used without departing from the intended scope.

The vehicle 10 may be embodied as a battery electric vehicle (BEV) as shown, i.e., lacking non-electrical means of propulsion such as an internal combustion engine. Alternatively, the vehicle 10 could be configured as an extended-range electric vehicle (EREV) in part by adding a small engine (not shown) to the drivetrain so as to provide engine torque as needed to turn a separate generator (not shown) for additional electrical energy generation. Likewise, the vehicle 10 could be configured as a hybrid electric vehicle (HEV), whether plug-in or conventional, in part by appropriately sizing the engine (not shown) and allowing the engine to deliver engine torque to the driveline. In other possible configurations, a single MGU 16 may be used to power the vehicle 10 from either the front or from the rear, or a pair of MGUs 16 could be used to power each of the respective front and rear axles 17, 18.

In the example embodiment shown in FIG. 1, the vehicle 10 may include a battery pack (B) 24, for instance a rechargeable lithium ion battery pack or module. The battery pack 24 may be electrically connected to each MGU 16 via a voltage converter (VC) 26, e.g., a DC-to-DC converter. The voltage converter 26 may be used to step the input or output voltage to or from the battery pack 24 to a calibrated voltage level and/or to regulate the voltage, as is well understood in the art. Alternatively, each MGU 16 may house its own voltage converter 26 and other required regulation/control circuitry, e.g., the power circuit 97 shown in FIG. 9 and explained below.

The vehicle 10 also includes an electronic motor control unit or controller (C) 30. The controller 30 is configured for controlling the power flow to and from each MGU 16. A control method 100 collectively represents any code or computer-executable instructions needed for controlling each MGU 16. Such instructions may be recorded in tangible, non-transitory memory 28 and automatically executed by suitable hardware components of the controller 30 to thereby control each MGU 16, doing so via bi-directional control signals (arrows 11), independently and/or interdependently as determined by the particular powertrain design.

The controller 30 may include a microprocessor or central processing unit, read only memory (ROM), random access memory (RAM), electrically-erasable programmable read only memory (EEPROM), a high-speed clock, analog-to-digital (A/D) and digital-to-analog (D/A) converter circuitry, and input/output circuitry and devices (I/O), as well as appropriate signal conditioning and buffer circuitry. Any media used as tangible/non-transitory memory for recording the method 100 may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer.

Method 100 may entail, for example, steps such as detecting, via the controller 30 and any required sensors, a state of charge of the battery pack 24, driver-input signals such as a position and/or travel of a by-wire accelerator pedal (not shown), vehicle speed, and any other required vehicle operating parameters, and then automatically determining which of the MGUs 16 to control as generators or motors.

Figure 2:
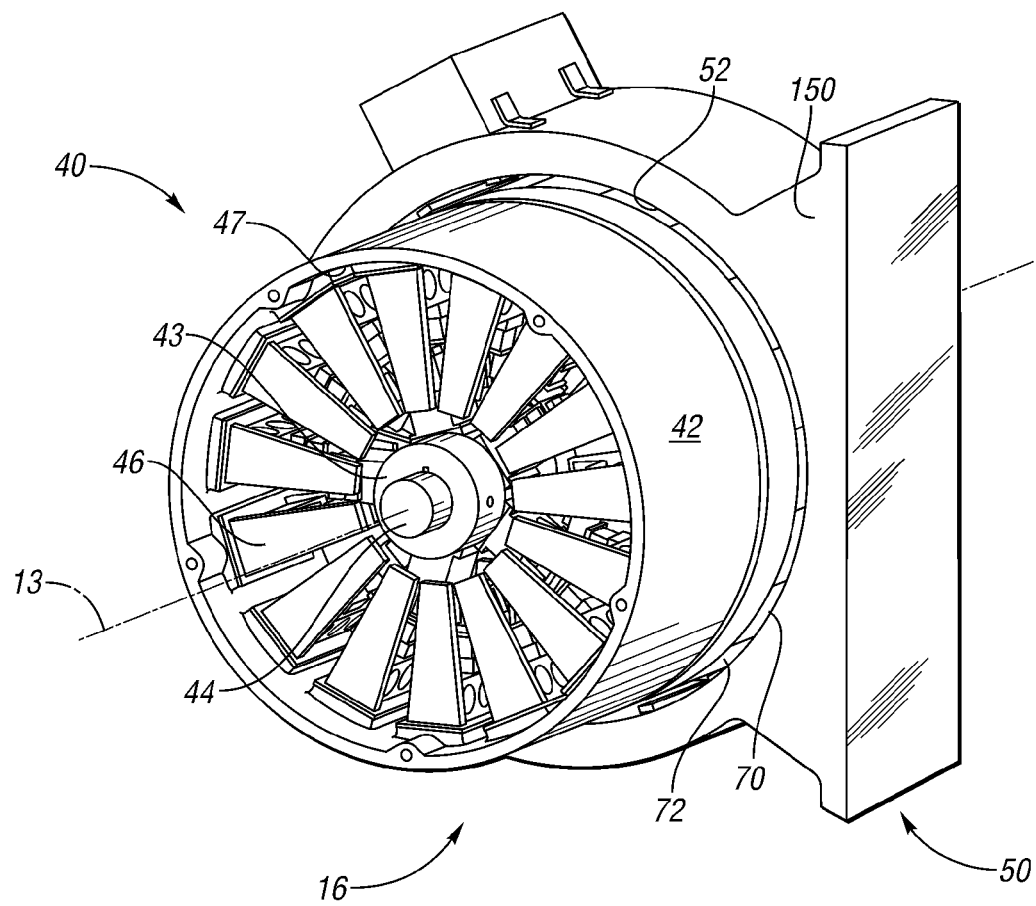
FIG. 2 is a perspective view illustration of the present MGU.

Referring to FIG. 2, the MGU 16 includes two chambers or portions: a DC brushless motor 40 and a generator 50. Because the present suspended rotor design described below provides negligible levels of friction, electrical energy needed to turn the axles 17, 18 (see FIG. 1) must overcome only the weight of the attached permanent magnets. Thus, the generator 50 can produce electrical energy while the motor 40 is running. If the motor 40 is not running but the axle(s) 17 and/or 18 are still moving, the generator 50 can still produce energy. The actual design and use of the MGU 16 can account for these possibilities.

Each chamber includes a rotor and a stator as described below. Thus, the MGU 16 includes two different rotors and two different stators. The motor 40 includes a first chassis 42. The first chassis 42 includes an inner wall 47, which is annular and thus fully circumscribes a plurality of equally-spaced stator brackets 46. In the example embodiment shown, the MGU 16 has fifteen of the stator brackets 46, although more or fewer stator brackets 46 may be used depending on the configuration and intended use.

The stator brackets 46 are arranged in a ring facing an axis of rotation 13 of the motor 40. The stator brackets 46 form a series of electromagnets which collectively magnetically suspend the rotor portion of the motor 40. A rotor shaft 44 and a rotor hub 43 of the rotor are shown in FIG. 2. In this manner, the MGU 16 provides propulsive torque with negligible friction in a manner somewhat analogous to the operation of a magnetic levitation (maglev) train.

The generator 50 includes a second chassis 150. Chassis 150 has an inner wall 52 which is annular or ring-shaped. A plurality of stator coils 59 (see FIG. 9) are circumscribed by the inner wall 52. The generator 50 also includes a stacked plurality of wedge-shaped permanent magnets 72 (see FIG. 7) and a stacked plurality of insulating plates 70 (see FIG. 6). The plates 70 may be constructed of a suitable ceramic in one possible embodiment. The configuration and operation of the generator 50 will be described in further detail below with reference to FIGS. 6-9.

Figure 3:
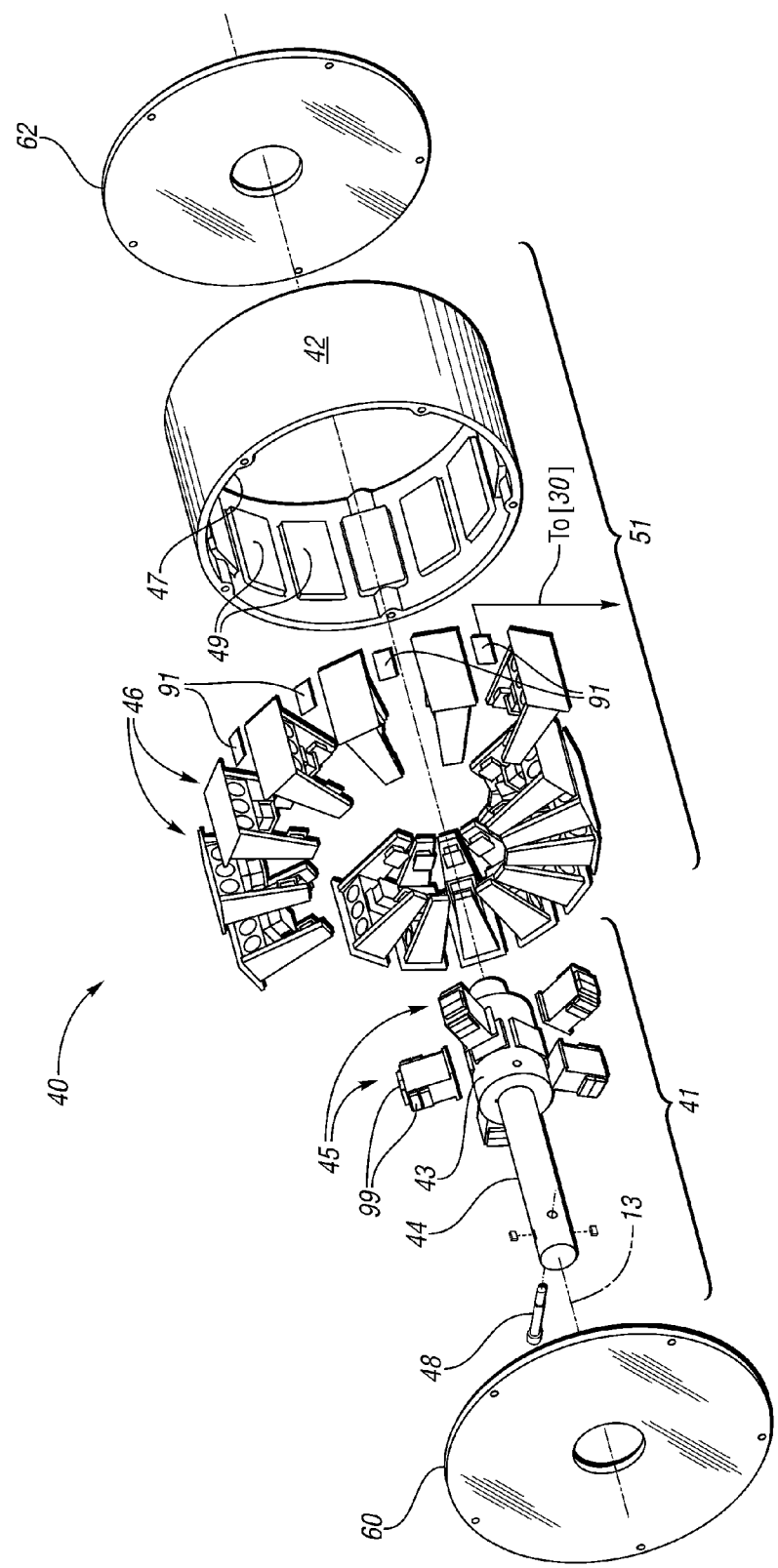
FIG. 3 is an exploded perspective view illustration of one possible embodiment of a motor portion of the MGU shown in FIG. 2.

Referring to FIG. 3, the motor 40 is shown in an exploded-view format to further detail the various components contained therein. Lightweight composite or aluminum plates 60, 62 enclose the inner components of the motor 40 and protect the same from the elements. The plates 60, 62 are omitted from FIG. 2 for illustrative clarity. Additional seals (not shown) may be used to provide the required sound proofing and further insulation.

The rotor shaft 44 of a rotor assembly 41 may be bolted or otherwise fastened to another shaft (not shown) external to the motor 40, e.g., via a fastener 48, or by welding, journaling, or any other suitable means. The rotor hub 43 in the example embodiment of FIG. 3 is cylindrical, and is welded or bolted to a plurality of equally-spaced armatures 45. Armatures 45 project radially-outward with respect to the axis of rotation 13. Each armature 45 may be connected to a plurality the permanent magnets 99. In a possible example embodiment, the permanent magnets 99 may be constructed of Neodymium, or alternatively of any other suitable ferrous or non-ferrous magnetic material.

Three pairs of the permanent magnets 99 may be disposed on three different sides of each armature 45, with five armatures 45 used in the example embodiment of FIG. 3. However, the number of permanent magnets 99 and/or armatures 45, as well as the size and magnetic strength of the permanent magnets 99, may be selected so as to tune the performance of the motor 40 to suit the particular application in which it is being used.

Referring briefly to FIGS. 4A and 4B, in another possible embodiment the rotor hub 43 may be configured as an alternative fly-wheel rotor hub 143 so as to provide a greater amount of surface area relative to the cylindrical rotor hub 43 of FIG. 3. Such an embodiment allows a greater number of permanent magnets 99 to be used.

For instance, the rotor hub 143 may have an inner wall 141 defining a bore which is connected to the rotor shaft 44 shown in FIG. 2. The rotor hub 143 may also have a primary radial face 20, i.e., the outer diameter, and a secondary axial face 90, i.e., the thickness of the rotor hub 143. Permanent magnets 99 may be welded to, bonded, or otherwise joined to axial face 90 and equally spaced around the entire circumference of the rotor hub 143 as shown. Additional permanent magnets 99 may be likewise joined with radial face 20, also equally spaced as shown. In this manner, the rotor hub 143 may provide an increased number of permanent magnets 99 relative to the design of FIG. 3.

Referring once again to FIG. 3, the motor 40 also includes a stator assembly 51. The stator assembly 51 includes equally-spaced stator brackets 46 arranged in a ring, i.e., annularly. Between each stator bracket 46 is positioned a Hall effect sensor 91, only a few of which is shown for simplicity and illustrative clarity. Each Hall effect sensor 91 is configured to measure the current position of the permanent magnets 99 of the rotor hub 43, 143 using the measured Hall effect, as is well understood in the art.

The Hall effect sensors 91 transmit positional signals to the controller 30 of FIG. 1 as part of the control signals (arrows 11) shown in the same Figure. The controller 40 of FIG. 1 may include suitable amplification circuitry as needed to boost the low-level signal from the Hall effect sensors 91. In this manner, the controller 30 is able to determine which of the stator brackets 46 to selectively energize, and also to control the frequency and energizing sequence.

The stator assembly 51 includes a plurality of mounting pads 49 within the chassis 42, e.g., fifteen equally-spaced mounting pads 49 in one embodiment. The mounting pads 49 are formed integrally with or rigidly connected/welded to the inner wall 47 as shown. Each of the mounting pads 49 provides a suitable surface area and contour for mounting a respective one of the stator brackets 46, e.g., via welding, potting, bonding, or other suitable means.

Referring to FIG. 5, each of the stator brackets 46 includes a base 63 and a pair of side walls 61 that, once installed, are oriented toward the axis of rotation 13 (see FIG. 3). The base 63 may be flat and rectangular as shown to provide a shape/contour which is compatible with that of the mounting pads 49 of FIG. 3. Alternatively, the base 63 may be shaped, for instance as an arc, to thereby mount directly to the inner wall 47 of the chassis 42 shown in FIG. 3. Other shapes and contours are possible without departing from the intended inventive scope.

The side walls 61 are welded to, formed integrally with, or otherwise connected to the base 63 and a transverse, rectangular block 69 to form a unitary piece as shown. The block 69 is welded to or formed integrally with the side walls 61 and the base 63. Additionally, the block 69 may define a set of cooling channels 65 to facilitate cooling of the stator bracket 46. Cooling channels 65 may be in fluid communication with a source of cooling fluid (not shown), or may be air cooled depending on the embodiment.

A post 64 projects perpendicularly with respect to the block 69. Likewise, a post 64 projects perpendicularly with respect to each of the side walls 61, for a total of three posts 64. As shown, the posts 64 of the side walls 61 are positioned directly opposite each other. The remaining post 64 is oriented perpendicularly with respect to the other two posts 64. A wire 71, e.g., poly-coated, copper cored solenoid wire, is wrapped around each of the three posts 64 to form three different poles 67 as shown, with the wire 71 electrically connected to the battery pack 24 of FIG. 1 or another suitable energy source.

The side walls 61 and the base 63 may be constructed of a lightweight, substantially rigid material such as aluminum in one possible embodiment, and arranged to form a U-shaped profile. In this manner, each of the stator brackets 46 of FIG. 5 includes three electromagnet cores, and the permanent magnets 99 of the rotor assembly 41 (see FIG. 3) are magnetically suspended in close proximity to each of the posts 64 within the void defined between the three posts 64.

Figure 9:
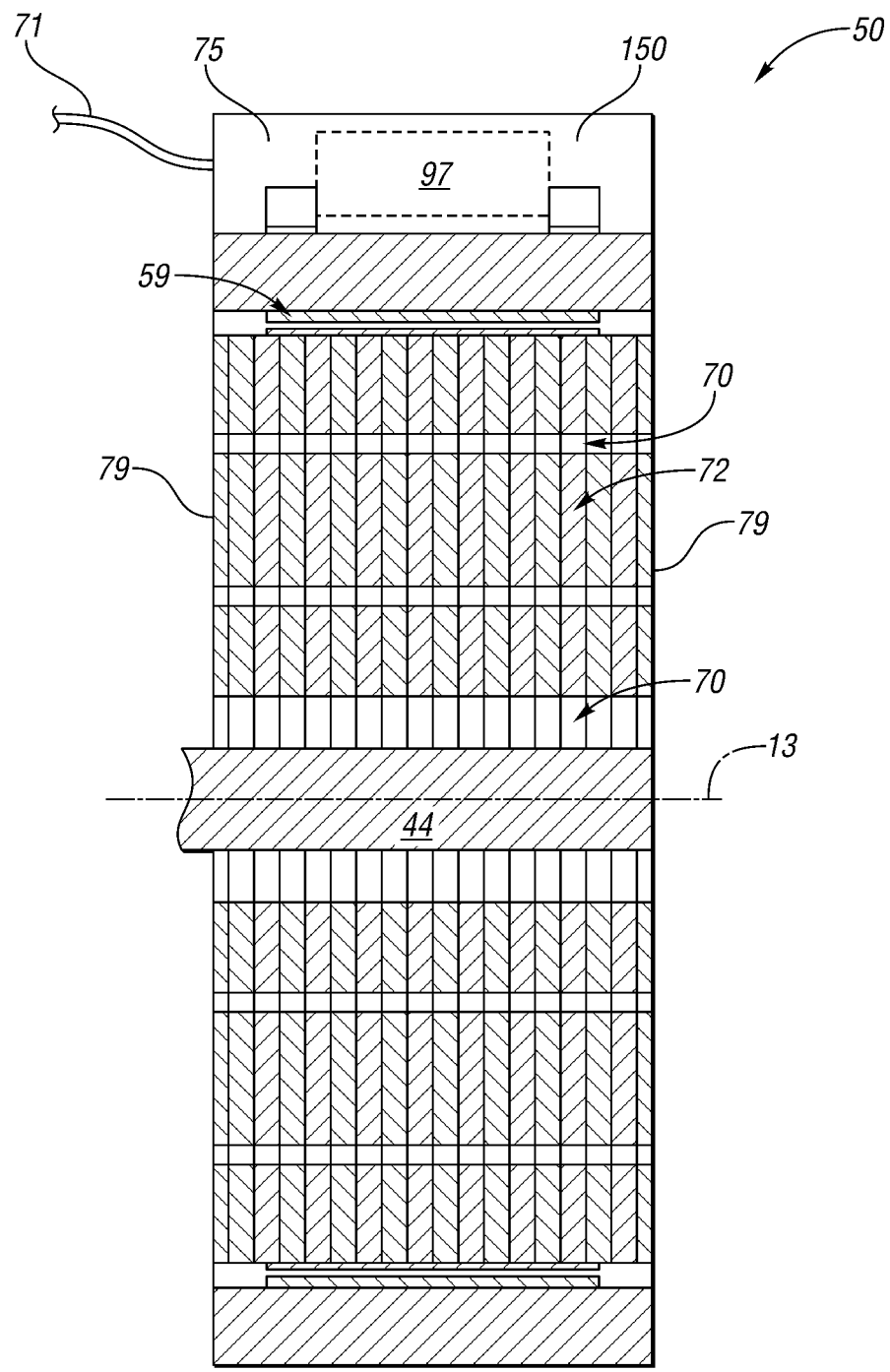
FIG. 9 is a cross-section side view of the generator portion of the present MGU.

Referring briefly to FIG. 9, the generator 50 of FIG. 2 includes the chassis 150, e.g., cast aluminum, which circumscribes another rotor and stator. The rotor shaft 44 extends axially into the generator 50 as shown. A plate 79, or optionally the same plate 62 as shown in FIG. 3, and a substantially identical plate 79 enclose a plurality of insulating plates 70 and a plurality of wedge-shaped permanent magnets 72.

Additionally, windings or coils 59 are positioned on the inner wall 52 of the chassis 150. Optionally, the chassis 150 may include a housing section 75 containing the power circuit 97 as noted elsewhere above to provide localized voltage conditioning, transformation, and/or regulation as needed with respect to electrical power supplied to the generator 50 via wire 71.

Figure 6:
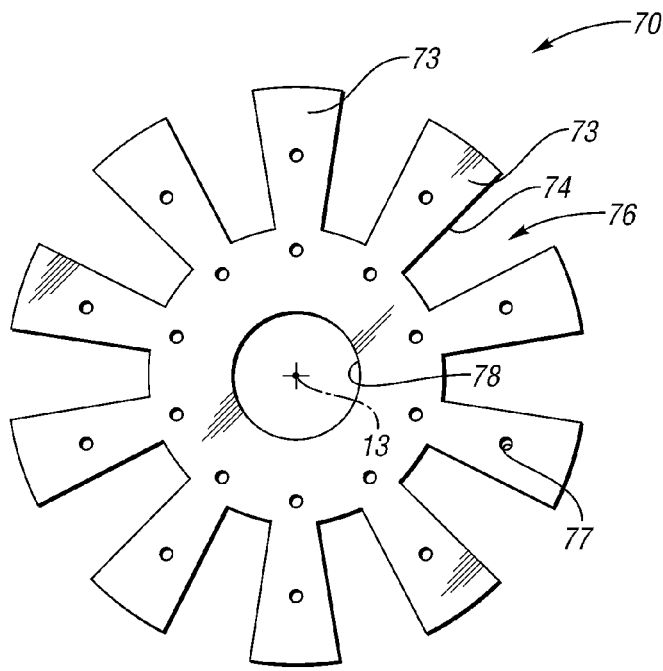
FIG. 6 is a plan view of an insulated plate usable with the generator portion of the present MGU.

Referring to FIG. 6, the plates 70 may be stacked immediately adjacent with respect to each other. More or fewer plates 70 may be used, with the thickness of each plate 70 varying with the design. Each plate 70 may include a plurality of outwardly-projecting teeth 73. The teeth 73 are equally spaced with respect to one another, with the sides 74 of each adjacent pair of teeth 73 defining a gap 76. Each plate 70 defines an inner bore wall 78 which circumscribes and is attached to the rotor shaft 44 (see FIG. 9) and axis of rotation 13. In one embodiment, the plates 70 are constructed of ceramic. Holes 77 may be formed in or defined by the plates 70, through which a pin or rod (not shown) may be inserted to help retain the plate 70 with respect to the wedge-shaped permanent magnets 72 (see FIGS. 7 and 9).

Figure 7:
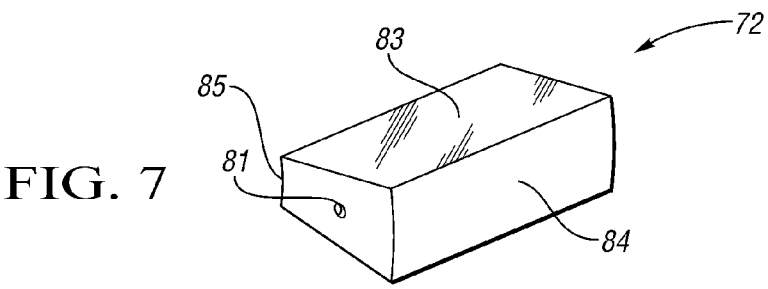
FIG. 7 is a perspective view of a shaped permanent magnet usable with the generator portion.

Referring to FIG. 7, an example permanent magnet 72 may have a wedge shape as shown, i.e., tapering along a first surface 83 between a second surface 84 and a third surface 85. The permanent magnets 72 may be constructed, for example, of Neodymium or other suitable materials. A plurality of the permanent magnets 72 are then stacked with respect to each other and positioned within the various gaps 76 of FIG. 6 to thereby substantially fill the gaps 76, as shown in FIG. 9. As noted above, a pin or rod (not shown) may be inserted into a hole 77 defined by the plate 70, as shown in FIG. 6, and an adjacent hole 81 defined by the permanent magnet 72 to help retain the assembly.

Figure 8:
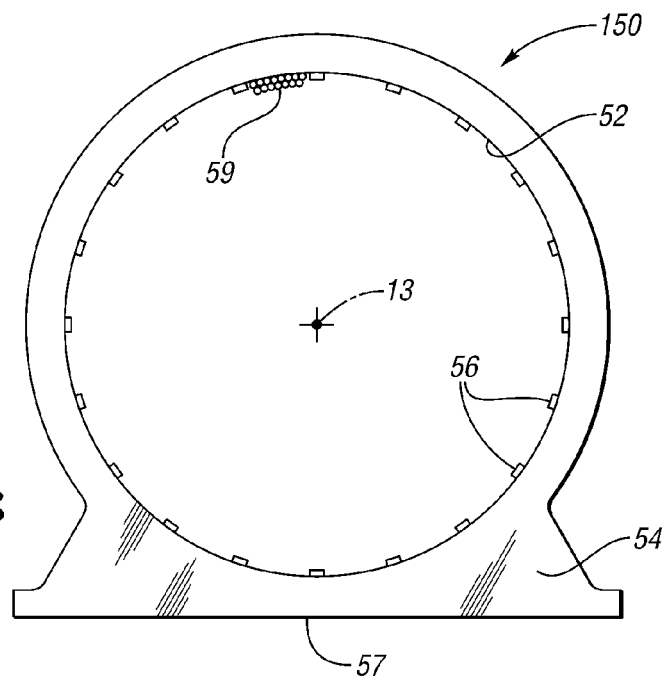
FIG. 8 is a chassis for the generator portion.

Referring to FIG. 8, the second chassis 150 of the generator 50 includes a plurality of equally spaced stator posts 56. A stator coil 59 is positioned between each post 56, with only one stator coil 59 shown for simplicity. The inner wall 52 of chassis 150 circumscribes the axis of rotation 13 as shown, and thus the plates 70 and permanent magnets 72 of respective FIGS. 6 and 7. The chassis 150 may include a base 54 having a mounting surface 57 suitable for connecting the chassis 150 to a surface, e.g., of the vehicle 10 of FIG. 1. Thus, the chassis 150 provides structure and support to the entire MGU 16 of FIG. 2. Either or both of chassis 50 and chassis 150 may define internal cooling channels (not shown) for conducting a liquid coolant or air as needed, as is well understood in the art. In other embodiments, such coolant may be delivered to the various coils of the MGU 16 to provide direct cooling.

While the best modes for carrying out the invention have been described in detail, those familiar with the art to which this invention relates will recognize various alternative designs and embodiments for practicing the invention within the scope of the appended claims.

The invention claimed is:

1. An electromagnetic motor-generator unit (MGU) comprising:
a motor including:
a rotatable rotor hub;
a plurality of permanent magnets disposed on the rotor hub;
a rotatable rotor shaft connected to the rotor hub;
a plurality of stator brackets arranged in a ring, wherein each of the stator brackets includes a pair of side walls connected by a base to form a generally U-shaped profile, and wherein each of the side walls and base includes a post around which is wound a respective first, second, and third coil each being selectively energizable via a battery pack; and
a first chassis which circumscribes the stator brackets, wherein the base of each stator bracket is connected to an inner wall of the first chassis; and
a generator positioned adjacent to and coaxially-aligned with the motor, and including:
a plurality of insulating rotor plates each having a plurality of equally spaced and radially-outwardly projecting teeth, wherein a gap is defined between the sides of each of the teeth, and wherein the rotor plates are connected to the rotor shaft to rotate in conjunction with the rotor shaft;
a plurality of wedge-shaped permanent magnets stacked within the gaps of the rotor plates and substantially filling the gaps; and
a second chassis circumscribing the rotor plates and the wedge-shaped permanent magnets, and having a plurality of coils disposed on an inner face of the chassis;
wherein the plurality of coils are connectable to a battery pack to selectively recharge the battery pack when the rotor shaft is rotating.

2. The MGU of claim 1, further comprising a plurality of armatures, wherein:
the rotor hub is cylindrical; and
at least one of the permanent magnets of the motor is disposed on three different sides of each of the armatures.

3. The MGU of claim 2, wherein the plurality of armatures includes at least five equally-spaced armatures.

4. The MGU of claim 1, wherein the rotor hub is a flywheel or disc having an axial face and a radial face, and wherein some of the permanent magnets of the motor are connected to each of the axial and the radial faces.

5. The MGU of claim 1, wherein at least some of the permanent magnets of the motor and the wedge-shaped permanent magnets of the stator are constructed of Neodymium.

6. The MGU of claim 1, wherein the stator brackets each include a block which is connected to the side walls and to the base, and which defines a plurality of cooling channels.

7. The MGU of claim 1, wherein the plurality of insulating rotor plates are constructed substantially of ceramic.

8. A vehicle comprising:
a driven wheel;
a battery pack; and
a motor-generator unit (MGU) configured for delivering torque to the driven wheel, wherein the MGU includes:
a motor having:
a rotatable rotor hub;
a plurality of permanent magnets disposed on the rotor hub;
a rotatable rotor shaft connected to the rotor hub and to the driven wheel;
a plurality of stator brackets arranged in a ring, wherein each of the stator brackets includes a pair of side walls connected by a base to form a generally U-shaped profile, and wherein each of the side walls and base includes a post around which is wound a respective first, second, and third coil each being electrically connected to and selectively energizable by the battery pack; and
a first chassis which circumscribes the stator brackets, wherein the base of each stator bracket is connected to an inner wall of the first chassis; and
a generator positioned adjacent to and coaxially-aligned with the motor, and including:
a plurality of insulating rotor plates each having a plurality of equally spaced and radially-outwardly projecting teeth, wherein a gap is defined between the sides of each of the teeth, and wherein the rotor plates are connected to the rotor shaft to rotate in conjunction with the rotor shaft;
a plurality of wedge-shaped permanent magnets stacked within the gaps of the rotor plates and substantially filling the gaps; and
a second chassis circumscribing the rotor plates and the wedge-shaped permanent magnets, and having a plurality of coils disposed on an inner face of the chassis, wherein the plurality of coils are electrically connected to the battery pack to selectively recharge the battery pack when the rotor shaft is rotating.

9. The vehicle of claim 8, wherein the MGU is a brushless DC electric machine.

10. The vehicle of claim 8, further comprising a plurality of armatures, wherein:
the rotor hub is cylindrical; and
at least one of the permanent magnets of the motor is disposed on three different sides of each of the armatures.

11. The vehicle of claim 10, wherein the plurality of armatures includes at least five equally-spaced armatures.

12. The vehicle of claim 8, wherein the rotor hub is a flywheel or disc having an axial face and a radial face, and wherein some of the permanent magnets of the motor are connected to each of the axial and the radial faces.

13. The vehicle of claim 8, wherein at least some of the permanent magnets of the motor and the wedge-shaped permanent magnets of the stator are constructed of Neodymium.

14. The vehicle of claim 8, wherein the stator brackets each include a block which is connected to the side walls and to the base, and which defines a plurality of cooling channels.

15. The vehicle of claim 8, wherein the plurality of insulating rotor plates are constructed substantially of ceramic.

16. An electromagnetic motor-generator unit (MGU) comprising:
a motor including:
a rotatable rotor hub, wherein the rotor hub is configured as a flywheel or disc having a primary radial face and a secondary axial face;
a first plurality of Neodymium permanent magnets arranged in a ring and welded to the primary radial face of the rotor hub;
a second plurality of Neodymium permanent magnets welded to the secondary axial face;
rotatable rotor shaft connected to the rotor hub;
fifteen stator brackets arranged in a ring, wherein:

each of the fifteen stator brackets includes a pair of side walls connected by a rectangular base and a rectangular block to form a generally U-shaped profile; and three posts, around which is wound a respective first, second, and third coil each being selectively energizable via a battery pack, wherein a corresponding one of the three posts is mounted to a respective one of the side walls and the rectangular block; and a first chassis which circumscribes the fifteen stator brackets, wherein the base of each stator bracket is connected to a rectangular mounting pad formed on an inner wall of the first chassis; and a generator positioned adjacent to and coaxially-aligned with the motor, and including:

a plurality of ceramic rotor plates each having ten equally spaced and radially-outwardly projecting teeth, wherein a gap is defined between the sides of each of the ten teeth, and wherein the ceramic rotor plates are connected to the rotor shaft to rotate in conjunction with the rotor shaft;

a plurality of wedge-shaped, Neodymium permanent magnets stacked within the gaps of the ten rotor plates and substantially filling the gaps; and a second chassis circumscribing the ten rotor plates and the wedge-shaped permanent magnets, and having a plurality of coils disposed on an inner face of the chassis;

wherein the plurality of coils are connectable to a battery pack to selectively recharge the battery pack when the rotor shaft is rotating.

* * * * *